United States Patent
K et al.

(10) Patent No.: US 11,281,399 B2
(45) Date of Patent: *Mar. 22, 2022

(54) DUAL-INTERFACE STORAGE SYSTEM AND METHOD FOR USE THEREWITH

(71) Applicant: Western Digital Technologies, Inc., San Jose, CA (US)

(72) Inventors: Shiva K, Bengaluru (IN); Eldhose Peter, Bengaluru (IN); Rakesh Balakrishnan, Bengaluru (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/910,869

(22) Filed: Jun. 24, 2020

(65) Prior Publication Data
US 2021/0405919 A1    Dec. 30, 2021

(51) Int. Cl.
*G06F 3/06* (2006.01)
*G06F 13/40* (2006.01)

(52) U.S. Cl.
CPC .......... *G06F 3/0658* (2013.01); *G06F 3/0611* (2013.01); *G06F 3/0635* (2013.01); *G06F 3/0659* (2013.01); *G06F 3/0683* (2013.01); *G06F 13/4022* (2013.01)

(58) Field of Classification Search
CPC .... G06F 3/0661; G06F 3/0635; G06F 3/0683; G06F 3/0659; G06F 3/0658; G06F 13/4022; G06F 11/3041; G06F 3/0622; G06F 3/0628; G06F 3/0629
See application file for complete search history.

(56) References Cited

U.S. PATENT DOCUMENTS 8,151,037 B1 * 4/2012 Zhou ................. G06F 3/0656
                                                     711/103
8,478,916 B2   7/2013 Asnaashari
8,589,723 B2  11/2013 Kumar
(Continued)

FOREIGN PATENT DOCUMENTS

CN    203224819 U   10/2013
CN    107092570 A    8/2017
(Continued)

OTHER PUBLICATIONS

U.S. Appl. No. 16/853,233, filed Apr. 20, 2020, entitled "Dynamic Memory Controller and Method for Use Therewith".
(Continued)

*Primary Examiner* — Ernest Unelus
(74) *Attorney, Agent, or Firm* — Crowell & Moring LLP (57) ABSTRACT

A dual-interface storage system and method for use therewith are provided. In one embodiment, the storage system comprises a memory; a connector compatible with both a first host interface and a second host interface; a first data path to at least a part of the memory comprising the first host interface and a controller for the first host interface; a second data path to at least another part of the memory comprising the second host interface and a controller for the second host interface; and a switch configured to connect the connector to either the first data path or the second data path in response to a command from a host. Other embodiments are disclosed.

20 Claims, 6 Drawing Sheets

(56) References Cited

U.S. PATENT DOCUMENTS

| | | | |
|---|---|---|---|
| 8,874,820 B2 | 10/2014 | Oh et al. | |
| 8,943,234 B1* | 1/2015 | Voorhees | G06F 3/0653 |
| | | | 710/17 |
| 10,452,596 B2 | 10/2019 | Carey | |
| 2003/0110340 A1 | 6/2003 | Butler | |
| 2004/0083285 A1 | 4/2004 | Nicolson | |
| 2004/0083308 A1 | 4/2004 | Sebastian | |
| 2010/0023669 A1* | 1/2010 | Lee | G06F 13/387 |
| | | | 710/301 |
| 2010/0185808 A1* | 7/2010 | Yu | G06F 13/1684 |
| | | | 711/103 |
| 2011/0040924 A1 | 2/2011 | Selinger | |
| 2012/0128107 A1 | 5/2012 | Oren | |
| 2012/0260007 A1 | 10/2012 | Jibbe | |
| 2015/0154108 A1 | 6/2015 | Gorobets | |
| 2016/0259597 A1* | 9/2016 | Worley | G06F 13/4081 |
| 2016/0274803 A1 | 9/2016 | Earhart | |
| 2016/0328347 A1 | 11/2016 | Worley | |
| 2017/0123707 A1 | 5/2017 | Carey | |
| 2018/0004688 A1 | 1/2018 | Chung | |
| 2018/0113776 A1* | 4/2018 | Lee | G06F 1/3215 |
| 2019/0138440 A1 | 5/2019 | Lee | |
| 2019/0146695 A1 | 5/2019 | Kim | |
| 2019/0303147 A1 | 10/2019 | Brewer | |
| 2021/0157525 A1 | 5/2021 | Seo | |
| 2021/0157526 A1 | 5/2021 | Kwon | |
| 2021/0173785 A1 | 6/2021 | Jin | |
| 2021/0216469 A1 | 7/2021 | Park | |
| 2021/0243080 A1 | 8/2021 | Brewer | |

FOREIGN PATENT DOCUMENTS

| | | |
|---|---|---|
| CN | 206557760 U | 10/2017 |
| WO | WO 2018233222 A1 | 12/2018 |

OTHER PUBLICATIONS

U.S. Appl. No. 17/178,447, filed Feb. 17, 2021, entitled "Storage System and Method for Dynamic Selection of a Host Interface".

First Action Interview Pilot Program Pre-Interview Communication dated Aug. 10, 2021 for U.S. Appl. No. 16/853,233.

International Search Report completed May 19, 2021 for International Application No. PCT/US2021/016522.

Written Opinion completed May 19, 2021 for International Application No. PCT/US2021/016522.

Israel Patent Office Search Strategy completed May 5, 2021 for International Application No. PCT/US2021/016522.

* cited by examiner

DUAL-INTERFACE STORAGE SYSTEM AND METHOD FOR USE THEREWITH

BACKGROUND

A memory controller in a storage system can be implemented as an application-specific integrated circuit (ASIC) and often has a memory interface for communicating with a memory of the storage system and a host interface for communicating with a host (e.g., for receiving read/write commands and associated data from the host). The memory interface and the host interface can be designed to work with a specific protocol or standard.

DETAILED DESCRIPTION

By way of introduction, the below embodiments relate to a dual-Interface storage system and method for use therewith. In one embodiment, the storage system comprises a memory; a connector compatible with both a first host interface and a second host interface; a first data path to at least a part of the memory comprising the first host interface and a controller for the first host interface; a second data path to at least another part of the memory comprising the second host interface and a controller for the second host interface; and a switch configured to connect the connector to either the first data path or the second data path in response to a command from a host.

In some embodiments, the first host interface comprises a serial advanced technology attachment (SATA) interface, and wherein the second host interface comprises a peripheral component interconnect express (PCIe) interface.

In some embodiments, the connector comprises a M.2 connector.

In some embodiments, the switch is configured to switch between the first data path and the second data path a plurality of times.

In some embodiments, the switch is configured to connect the connector to one of the first and second data paths by default upon power up.

In some embodiments, the storage system is configured to detect a host capable of supporting only the first host interface or only the second host interface, and wherein the switch is configured to connect the connector to the first data path or the second data path in response to that detection.

In some embodiments, the host comprises an application layer, a driver layer, and a physical layer, and wherein the storage system comprises a physical layer, a command layer, and a controller back-end layer.

In some embodiments, the memory comprises a three-dimensional memory.

In another embodiment, a method is provided that is performed in a host in communication with a storage system comprising a memory, a first host interface, a second host interface, and a switch. The method comprises determining whether to use the first host interface or the second host interface; in response to determining to use the first host interface, sending a command to the storage system to cause the switch to connect the host with the first host interface; and in response to determining to use the second host interface, sending a command to the storage system to cause the switch to connect the host with the second host interface.

In some embodiments, the first host interface comprises a serial advanced technology attachment (SATA) interface, and wherein the second host interface comprises a peripheral component interconnect express (PCIe) interface.

In some embodiments, the host comprises a connector compatible with both the first host interface and the second host interface.

In some embodiments, the connector comprises a M.2 connector.

In some embodiments, the host determines whether to use the first host interface or the second host interface based on power usage.

In some embodiments, the host determines whether to use the first host interface or the second host interface based on which host application is accessing the storage system.

In some embodiments, the method further comprises sending commands to switch between the first and second host interfaces a plurality of times.

In some embodiments, the host comprises an application layer, a driver layer, and a physical layer, and wherein the storage system comprises a physical layer, a command layer, and a controller back-end layer.

In another embodiment, a storage system is provided comprising a memory; a first host interface; a second host interface; and means for switching between the first and second host interfaces in response to a command from a host.

In some embodiments, the means for switching comprises a dual host interface module.

In some embodiments, the means for switching comprises a switch.

In some embodiments, the first host interface comprises a serial advanced technology attachment (SATA) interface, and wherein the second host interface comprises a peripheral component interconnect express (PCIe) interface.

Other embodiments are possible, and each of the embodiments can be used alone or together in combination. Accordingly, various embodiments will now be described with reference to the attached drawings.

Figures 1A, 1B:
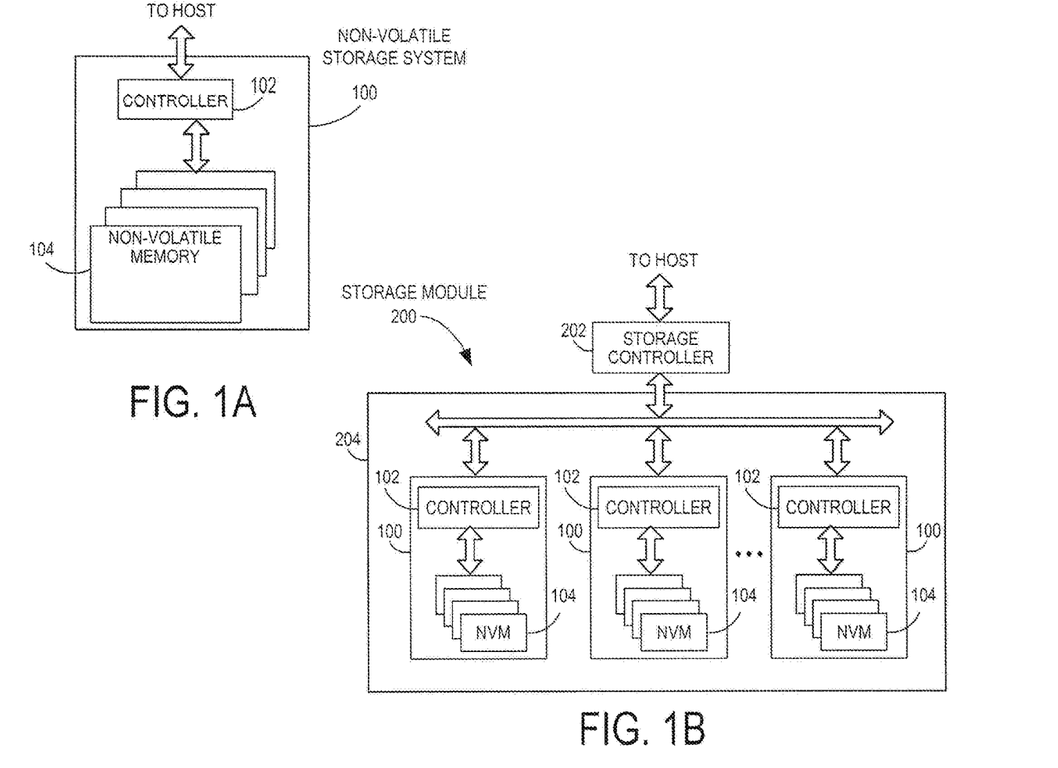
FIG. 1A is a block diagram of a non-volatile storage system of an embodiment.
FIG. 1B is a block diagram illustrating a storage module of an embodiment.
Figure 1C:
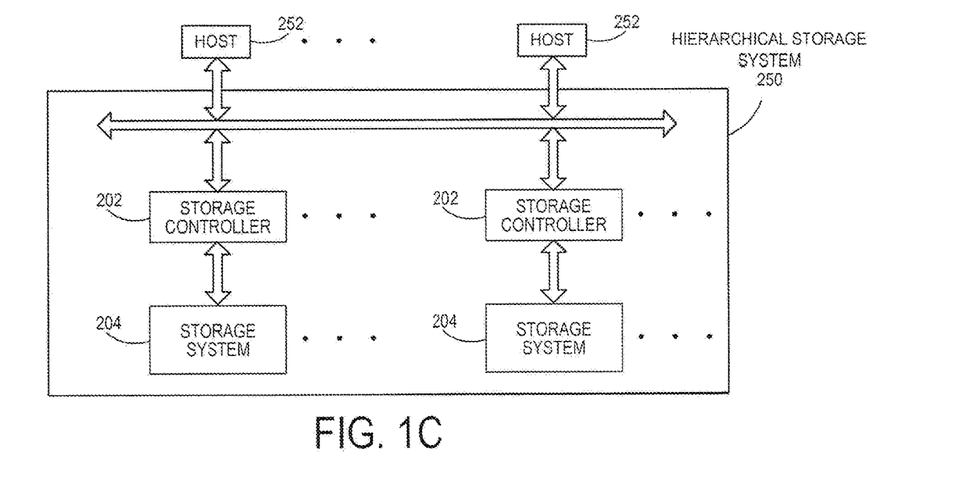
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2:
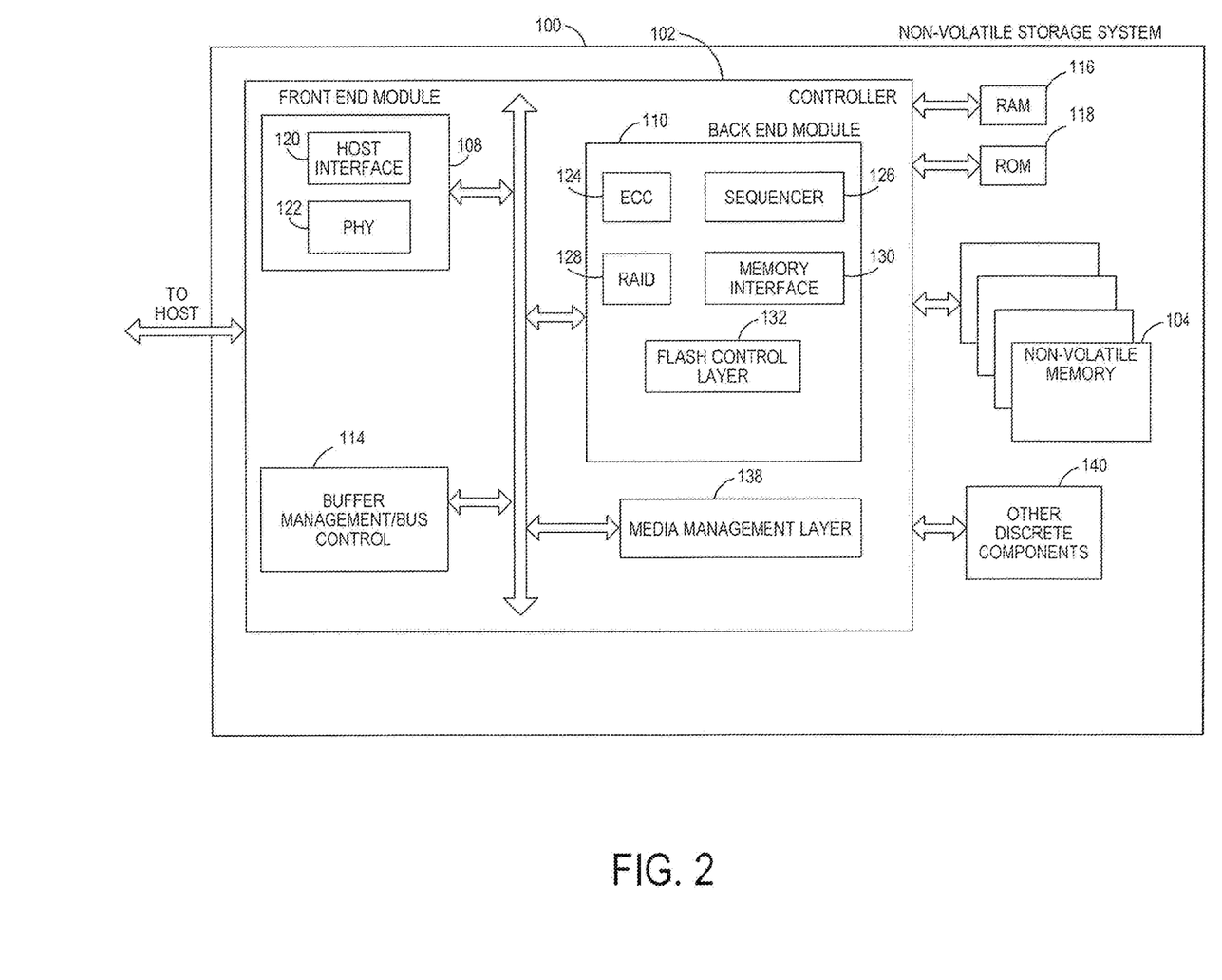
FIG. 2 is a block diagram illustrating components of the controller of the non-volatile storage system illustrated in FIG. 1A according to an embodiment.

FIG. 2 is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2 as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 3:
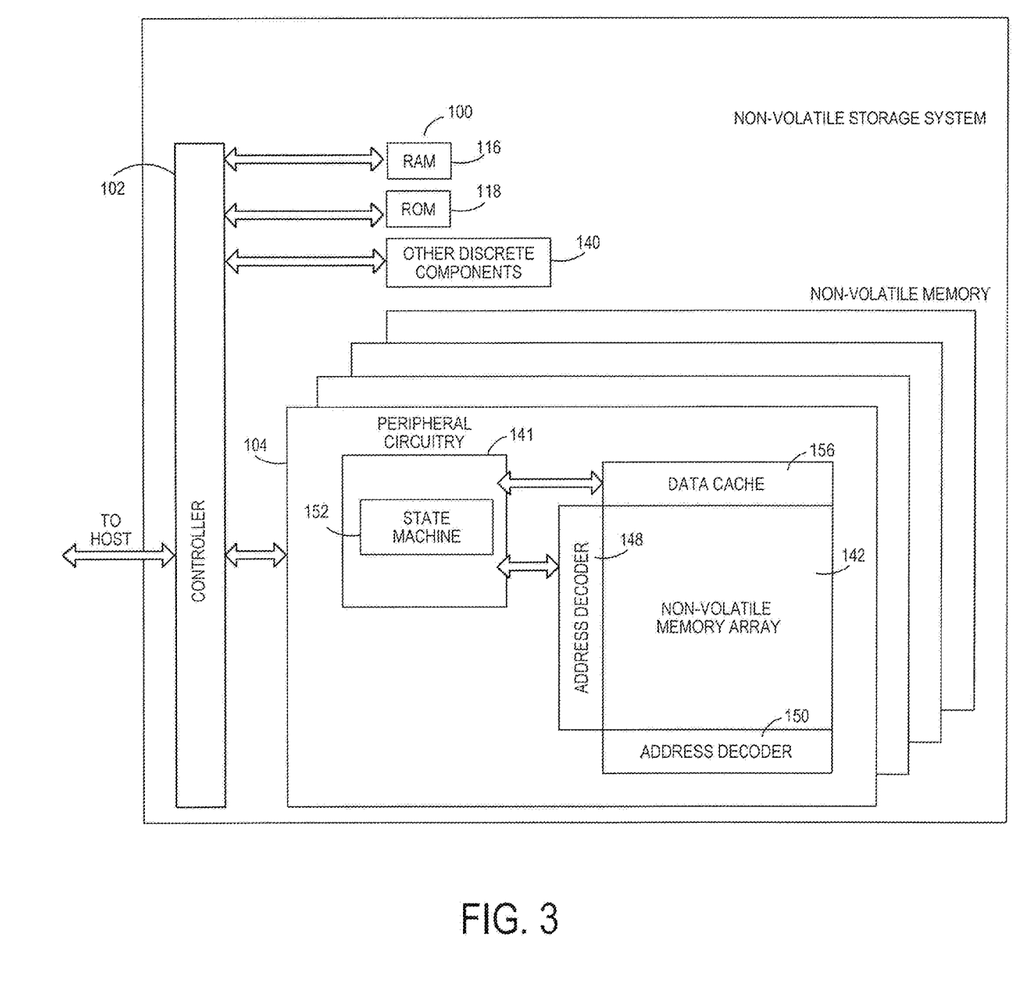
FIG. 3 is a block diagram illustrating components of the non-volatile storage system illustrated in FIG. 1A according to an embodiment.

FIG. 3 is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

SATA and PCIe are two interfaces used today to transfer data to a storage device, such as a solid-state drive (SSD). While SATA is the older of the two technologies, it has a much slower transfer speed than what is offered by a high-bandwidth interface like PCIe. Considering the way in which memory systems have evolved, PCIe is likely going to be the protocol of choice for the next generation of storage technologies. However, SATA has an edge over PCIe when it comes to pricing and power consumption. These advantages are some of the reasons why SATA is used even today in many systems. Thus, it is likely that SATA will be used for some time. However, a user may decide to switch between these two host interfaces. Unfortunately, current storage systems do not work seamlessly with both SATA and PCIe interfaces. Only one type of interface can be used by a host to communicate with storage system, and this selection is typically done at the factory depending on the configuration With reference to FIG. 4, in one example, the storage system (sometimes referred to herein as the storage device or just device) 100 can interface with the host through SATA as well as PCIe, and the host 300 can dynamically switch between the two interfaces as needed. It should be understood that while SATA and PCIe are used in this example as two types of host interfaces, these embodiments and the following claims are not limited to SATA and PCIe unless expressly recited therein. Further, more than two interfaces can be used.

Figure 4:
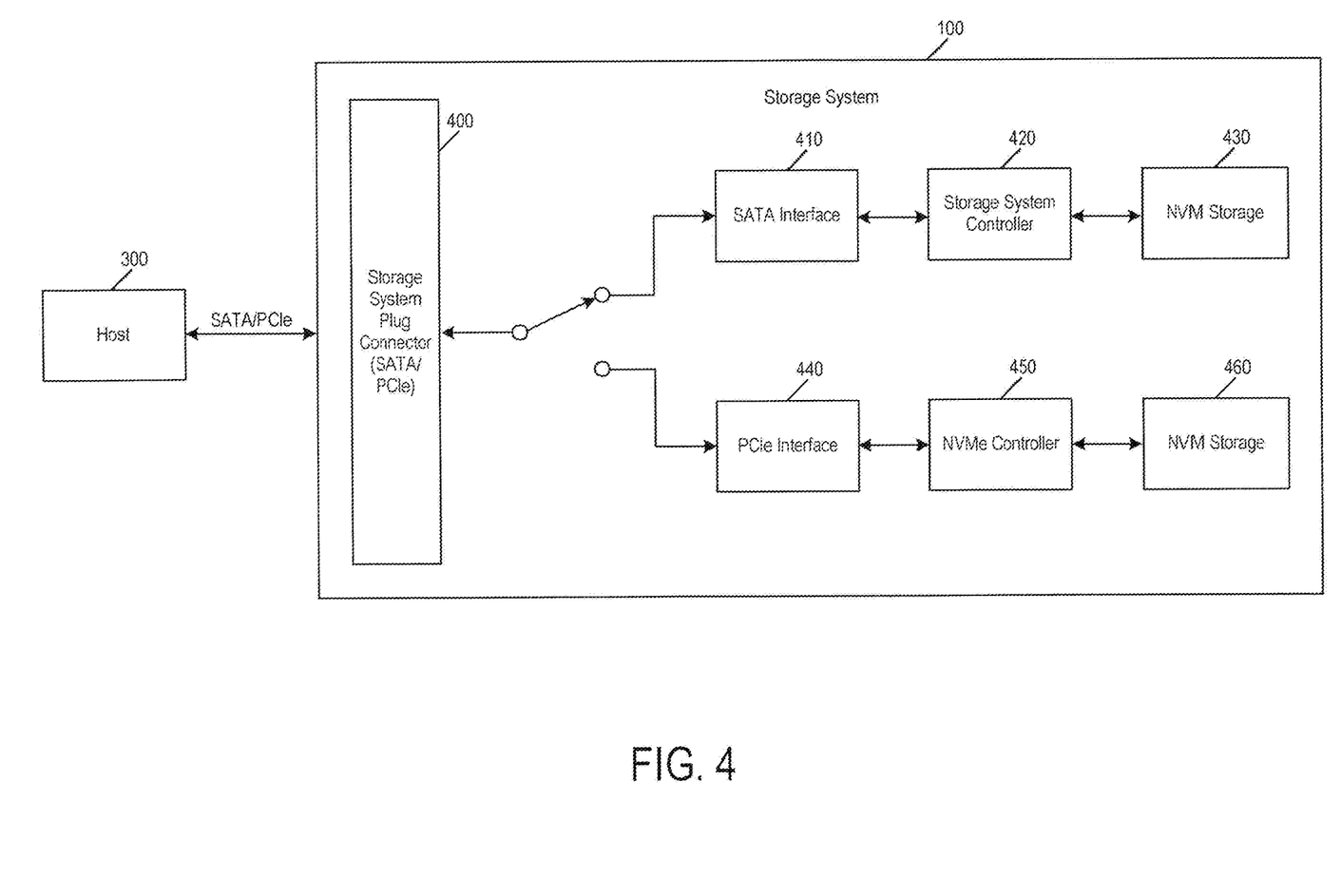
FIG. 4 is a block diagram of a storage system of an embodiment.

As shown in FIG. 4, in this example, the storage system 100 comprises a plug connector 400 that is compatible with both SATA and PCIe. An M.2 connector is an example of such a plug connector. The storage system 100 also comprises first and second data paths to the different parts of the memory 104. The first data path comprises the SATA interface 410 and a storage system controller 420 compatible with SATA. The second data path comprises the PCIe interface 440 and an NVMe controller 450. FIG. 4 shows the first data path going to non-volatile memory storage 430 and the second data path going to non-volatile memory storage 460. These two storage areas 430, 460 can both be part of the same memory (e.g., two different partition in of the memory 104), or each can be its own memory unit.

In operation, the host 300 determines whether to use the SATA interface or the PCIe interface. The host 300 can make this determination, for example, based on power usage and/or based on which host application is accessing the storage system 100. The host 300 then sends a command (e.g., a set of primitives) to the storage system 100 for the use of that interface. The command is interpreted by the storage system's firmware, and, in response to the command, the switch 400 connect the connector either to the SATA data path or the PCIe data path. After selecting the new interface, the host 300 can perform a device initialization sequence and start afresh.

In this embodiment, the host 300 can dynamically switch between the host interfaces any number of times on-the-fly. So, the configuration is not limited to occurring just at initialization of the storage system 100. However, because the switching can occur at any time, the storage system 100 may prefer to have the currently-unselected data path ready in case the host 300 decides to use that data path on the fly.

The switch 400 can be configured to connect the connector to one of the first and second data paths by default upon power up. Further, if the host 300 is only capable of supporting one host interface, the storage system 100 can be configured to detect the host interface that is supported by the host 300 and command the switch 400 to connect to the supported interface. This is referred to as auto-switch capability.

Through the use of the programmable switch 400, the storage system 100 in this embodiment can work seamlessly with the host 300 irrespective of the interface. This provides interoperability between SATA and PCIe protocols, and the same storage system 100 can be used to connect to a SATA host or a PCIe host. Thus, the storage system 100 is interoperable.

Figure 5:
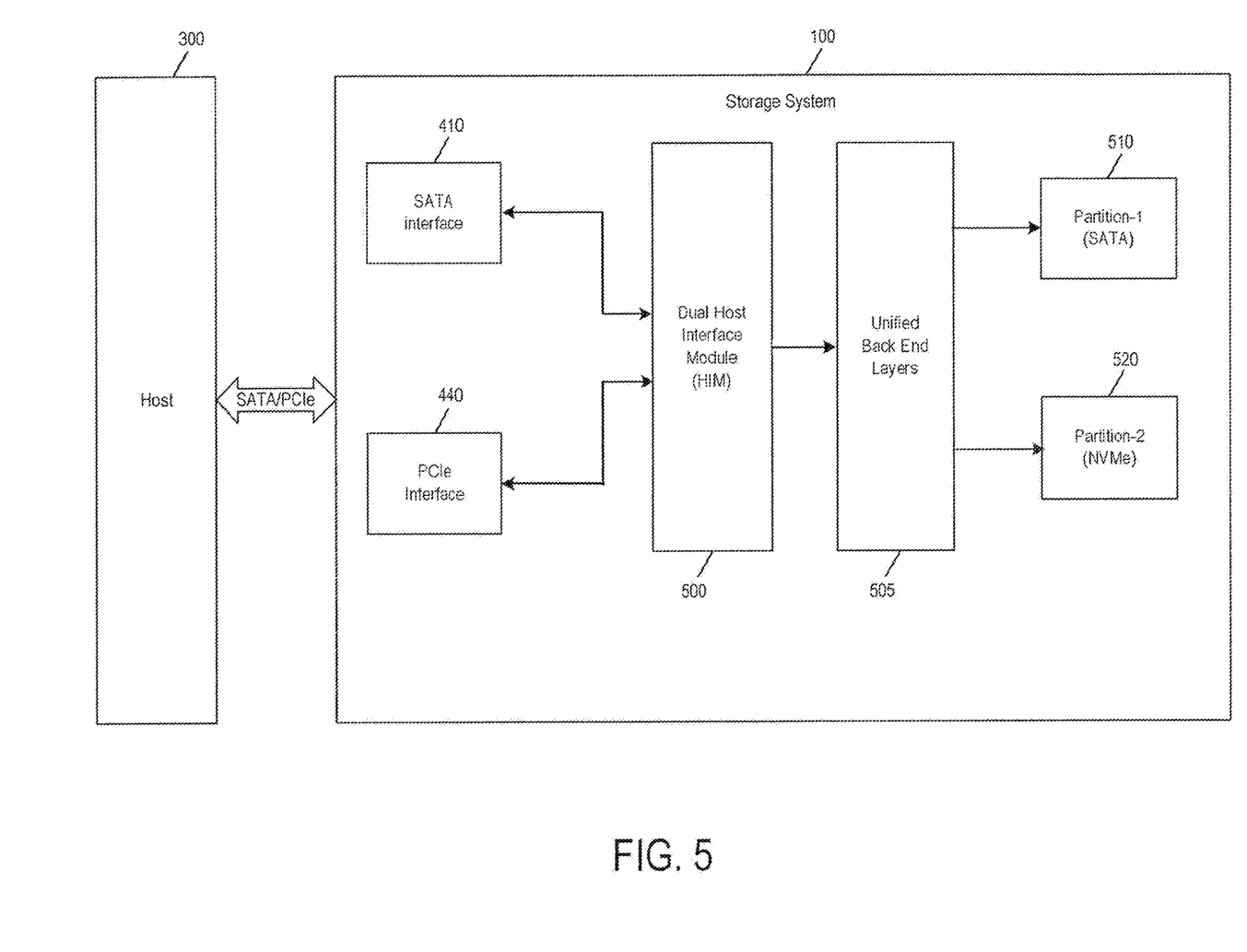
FIG. 5 is a block diagram of a storage system of another embodiment.

Further, because the host 300 can choose the interface based on power consumption requirements or which application is running on the host 300, the host 300 has the ability to select the host interface that best suits its requirements. For example, the host 300 may want to switch between SATA and PCIe for efficient power usage. That is, the host 300 can decide to switch to SATA mode when it wants to save more power. For example, when the host 300 is on battery mode where power saving is of high priority, it can decide to make a switch to SATA. Thus, it can get some power savings. Additionally, depending on the applications accessing the storage system 100, the host 300 can intelligently decide whether the application needs the high-speed PCIe interface. If not, it can choose to switch to SATA and get some additional power savings There are many alternatives that can be used with these embodiments. For example, as shown in FIG. 5, in another embodiment, the storage system 100 has the SATA interface 410 and the PCIe interface 440 facing the host 300, and a dual-host interface module (HIM) is used to receive whatever input is being provided by the host 300. The storage system 100 also comprises unified back-end layers 505 that provide data paths to the SATA partition 510 of the memory and the PCIe partition 520 of the memory.

Figure 6:
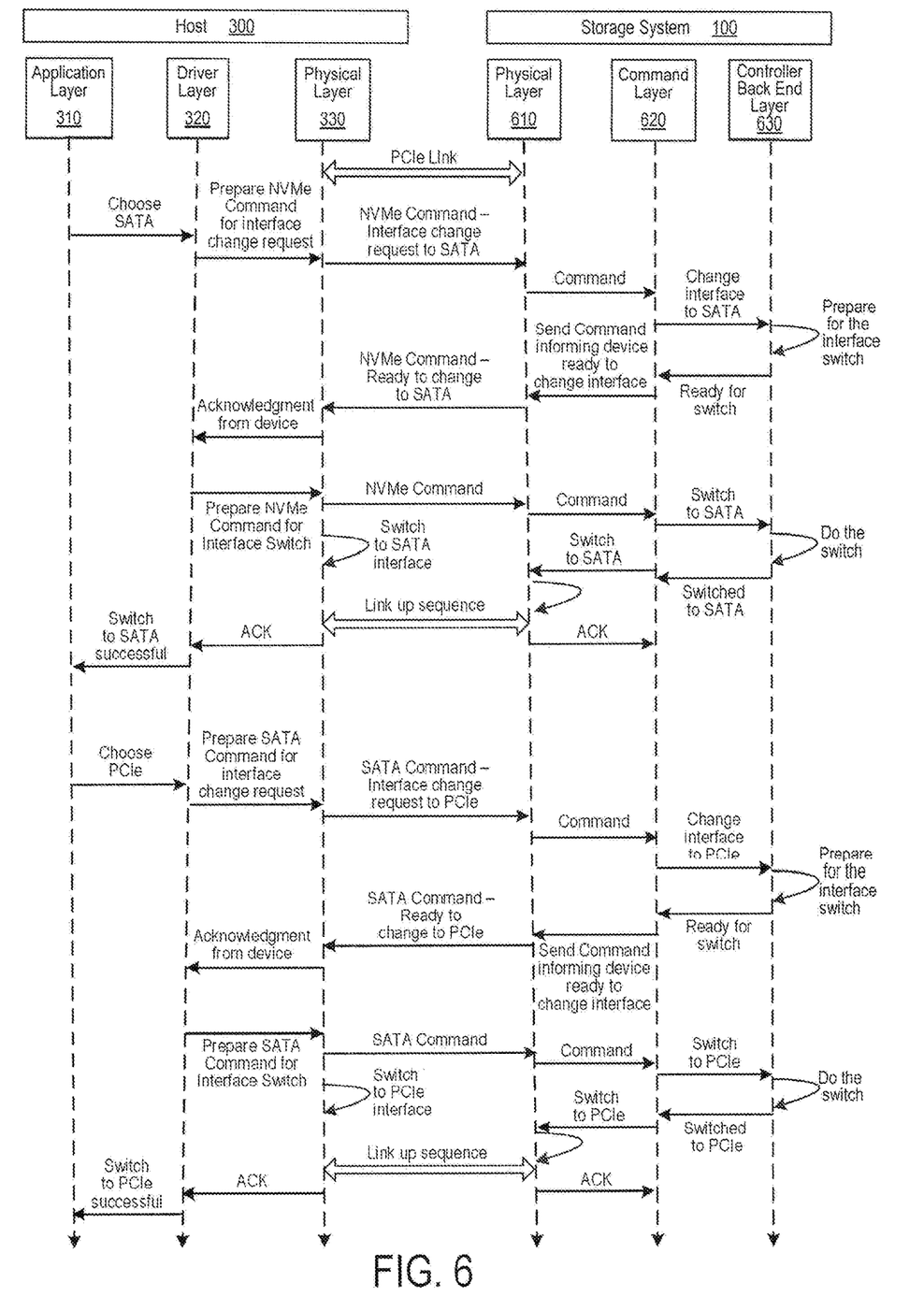
FIG. 6 is a flow diagram of a method of an embodiment for using a dual-interface storage system.

Turning again to the drawings, FIG. 6 is a flow diagram of a method of an embodiment for using a dual-interface storage system. In this example, the host 300 comprises an application layer 310, a driver layer 320, and a physical layer 330, and the storage system 100 comprises a physical layer 610, a command layer 620, and a controller back-end layer 630. FIG. 6 shows the various interactions among these components to switch between the two host interfaces.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
   a memory;
   a first host interface associated with a first protocol;
   a first controller for the first host interface;
   a second host interface associated with a second protocol;
   a second controller for the second host interface;
   a connector configured to connect with a host and compatible with both the first host interface and the second host interface; and
   a switch configured to connect the connector to either a first data path or a second data path in response to a command from the host to direct the storage system to use the first data path or the second data path, wherein in response to the switch being connected to the first data path, the switch is disconnected from the second data path, and vice versa;
   wherein:
      the first data path connects the first host interface and the first controller for the first host interface to at least part of the memory; and
      the second data path connects the second host interface and the second controller for the second host interface to at least another part of the memory.

2. The storage system of claim 1, wherein:
   the first host interface comprises a serial advanced technology attachment (SATA) interface; and
   the second host interface comprises a peripheral component interconnect express (PCIe) interface.

3. The storage system of claim 1, wherein the connector comprises a M.2 connector.

4. The storage system of claim 1, wherein the switch is further configured to switch between the first data path and the second data path a plurality of times.

5. The storage system of claim 1, wherein the switch is further configured to connect the connector to one of the first and second data paths by default upon power up.

6. The storage system of claim 1, wherein:
   the storage system is configured to detect a host capable of supporting only the first host interface or only the second host interface; and
   the switch is further configured to connect the connector to the first data path or the second data path in response to that detection.

7. The storage system of claim 1, wherein:
   the host comprises an application layer, a driver layer, and a physical layer;
   the storage system comprises a physical layer, a command layer, and a controller back-end layer.

8. The storage system of claim 1, wherein the memory comprises a three-dimensional memory.

9. A method comprising:
   performing the following in a host in communication with a storage system comprising a memory, a first host interface associated with a first protocol, a second host interface associated with a second protocol, a first memory interface, a second memory interface, a connector configured to connect with the host and compatible with both the first host interface and the second host interface, and a switch:
      determining whether to use the first host interface or the second host interface;

in response to determining to use the first host interface, sending a command to the storage system to cause the switch to connect the host with the first host interface, wherein a first data path connects the first host interface and a first controller for the first memory interface to at least part of the memory; and in response to determining to use the second host interface, sending a command to the storage system to cause the switch to connect the host with the second host interface, wherein a second data path connects the second host interface and a second controller for the second memory interface to at least another part of the memory;

wherein in response to the switch being connected to the first data path, the switch is disconnected from the second data path, and vice versa.

10. The method of claim 9, wherein:

the first host interface comprises a serial advanced technology attachment (SATA) interface; and the second host interface comprises a peripheral component interconnect express (PCIe) interface.

11. The method of claim 9, wherein the host comprises a connector compatible with both the first host interface and the second host interface.

12. The method of claim 11, wherein the connector comprises a M.2 connector.

13. The method of claim 9, wherein the host determines whether to use the first host interface or the second host interface based on power usage.

14. The method of claim 9, wherein the host determines whether to use the first host interface or the second host interface based on which host application is accessing the storage system.

15. The method of claim 9, further comprising sending commands to switch between the first and second host interfaces a plurality of times.

16. The method of claim 9, wherein:

the host comprises an application layer, a driver layer, and a physical layer; and the storage system comprises a physical layer, a command layer, and a controller back-end layer.

17. A storage system comprising:

a memory;

a first host interface associated with a first protocol;

a first controller for the first host interface;

a second host interface associated with a second protocol;

a second controller for the second host interface;

a connector configured to connect with a host and compatible with both the first host interface and the second host interface; and means for switching between a first data path and a second data path in response to a command from the host to direct the storage system to use the first data path or the second data path, wherein when the first data path is used, the second data path is not used, and vice versa;

wherein:

the first data path connects the first host interface and the first controller for the first host interface to at least part of the memory; and the second data path connects the second host interface and the second controller for the second host interface to at least another part of the memory.

18. The method of claim 9, wherein the storage system further comprises a first controller for the first host interface and a second controller for the second host interface.

19. The method of claim 18, wherein causing the switch to connect the host with the first host interface causes a connection between the first host interface and the first controller for the first host interface and at least part of the memory.

20. The method of claim 19, wherein causing the switch to connect the host with the second host interface causes a connection between the second host interface and the second controller for the second host interface and at least another part of the memory.

* * * * *